United States Patent [19]
Ramesh et al.

[11] Patent Number: 5,534,277
[45] Date of Patent: Jul. 9, 1996

[54] FILM FOR COOK-IN APPLICATIONS WITH PLURAL LAYERS OF NYLON BLENDS

[75] Inventors: Ram K. Ramesh, Greenville; Gerald B. Woods, Simpsonville; Robert W. Campbell, Duncan, all of S.C.

[73] Assignee: W. R. Grace & Co.-Conn., Duncan, S.C.

[21] Appl. No.: 352,466

[22] Filed: Dec. 9, 1994

[51] Int. Cl.$^6$ .................................................. A22C 13/00
[52] U.S. Cl. ....................... 426/129; 426/126; 426/127; 426/415; 428/35.9; 428/212; 428/246; 428/423.5
[58] Field of Search .................................. 426/129, 127, 426/126, 415, 412; 428/34.9, 35.9, 212, 246, 423.5; 525/183, 184

[56] References Cited

U.S. PATENT DOCUMENTS

| | | | |
|---|---|---|---|
| Re. 30,390 | 9/1980 | Kupcikevicius et al. | 17/49 |
| 4,120,928 | 10/1978 | Furukawa et al. | 264/171 |
| 4,486,507 | 12/1984 | Schumacher | 428/476 |
| 4,495,751 | 1/1985 | Galbiati | 53/576 |
| 4,501,798 | 2/1985 | Koschak et al. | 428/349 |
| 4,560,520 | 12/1985 | Erk et al. | 264/22 |
| 4,606,922 | 8/1986 | Schirmer | 426/412 |
| 4,612,221 | 9/1986 | Biel et al. | 428/35 |
| 4,647,483 | 3/1987 | Tse et al. | 428/35 |
| 4,659,599 | 4/1987 | Strutzel | 428/36 |
| 4,683,170 | 7/1987 | Tse et al. | 428/349 |
| 4,851,245 | 7/1989 | Hisazumi et al. | 426/105 |
| 4,855,183 | 8/1989 | Oberle | 428/345 |
| 4,897,295 | 1/1990 | Erk et al. | 428/34 |
| 4,944,970 | 7/1990 | Stenger et al. | 428/34 |
| 5,077,109 | 12/1991 | Lustig et al. | 428/36 |
| 5,079,051 | 1/1992 | Garland et al. | 428/34 |
| 5,085,890 | 2/1992 | Niaura et al. | 427/149 |
| 5,094,799 | 3/1992 | Takashige et al. | 264/514 |
| 5,106,693 | 4/1992 | Harada et al. | 428/412 |
| 5,185,189 | 2/1993 | Stenger et al. | 428/34 |
| 5,213,900 | 5/1993 | Friedrich | 428/474 |
| 5,356,676 | 10/1994 | Von Widdern et al. | 428/34.8 |

FOREIGN PATENT DOCUMENTS

| | | |
|---|---|---|
| 0170385 | 2/1986 | European Pat. Off. . |
| 0325151 | 1/1989 | European Pat. Off. . |
| 0331509 | 3/1989 | European Pat. Off. . |
| 0358038 | 3/1990 | European Pat. Off. . |
| 0408390A1 | 1/1991 | European Pat. Off. . |
| 0465931A2 | 1/1992 | European Pat. Off. . |
| 9007334 U | 4/1991 | Germany . |
| WO92/15641 | 9/1992 | WIPO . |

Primary Examiner—Esther M. Kepplinger
Assistant Examiner—Lien Tran
Attorney, Agent, or Firm—Mark B. Quatt

[57] ABSTRACT

A multilayer film having a first layer including a blend of a crystalline nylon and a material which disrupts the crystallinity of the crystalline nylon; a second layer also including this blend; and a third intervening layer, between the first and second layers, including a material having a modulus lower than the modulus of the crystalline nylon, and having a crystallinity of less than 60%. The nylon blend layers, which can be two or more in the film, add toughness and stiffness, but also elastic recovery to the final film. The intervening layer or layers of a material with relatively low modulus and crystallinity aid in orientation of the film during manufacture, permitting the use of more of the crystalline nylon than would be practical if only a single nylon layer was used.

25 Claims, 2 Drawing Sheets

FILM FOR COOK-IN APPLICATIONS WITH PLURAL LAYERS OF NYLON BLENDS

FIELD OF THE INVENTION

The present invention relates generally to multilayer films, and particularly to multilayer films suitable for use as packaging films. The present invention is also directed to a packaged product, and a process for packaging a meat product. The present invention is particularly related to films suitable for packaging protein-containing food products.

BACKGROUND OF THE INVENTION

Multilayer films are often used in cook-in applications for packaging food products such as mortadella, ham, and poultry products. These films are often oriented during manufacture, in order to impart heat shrinkability to the film when it is used to package a product. This feature assures a tight fitting package when the packaged product is exposed to a heated medium such as hot air or hot water, and the film shrinks tightly around the package. The orientation step can often be a critical step in determining the overall efficiency and cost of the total manufacturing process. It is therefore desirable to find materials that can be used in an orientation step in a more efficient way.

Crystalline polyamides such as Nylon 6 (polycaprolactam) are attractive materials to use in multilayer shrink films, especially those used in cook-in applications. Nylon 6 in particular provides some stiffness, heat and abuse resistance, and elastic recovery to the film. Shrink films with nylon 6 also offer high shrink tension. It is therefore desirable to include as much nylon 6 into an oriented film structure as possible, in particular for films intended for cook-in applications.

Unfortunately, the use of Nylon 6 in shrink films gives rise to certain problems as well. The same property of stiffness (i.e. high modulus) which is useful in films made from this material, also creates problems during the orientation of the film during manufacture. Nylon 6 is also a very crystalline material, and for this reason also does not readily orient, especially in tubular orientation processes. As the thickness of the nylon 6 goes up, it becomes increasingly difficult to orient at commercial rates. Optics of the finished film can be adversely affected, and in the worst case bubble breaks will result.

A potential solution can be found by lowering the temperature at which orientation is done. For example, instead of orienting at 210° F., the material can be oriented at 150° F. However, this is not a practical alternative because of another feature of nylon 6.

That feature is the cost of nylon 6. This material is usually more expensive than many olefinic polymer resins commercially available and useful in packaging applications, especially shrink packaging. It is therefore desirable from an economic viewpoint to incorporate relatively inexpensive olefinic polymers into multilayer films that also include nylon 6. Unfortunately, these olefins generally require relatively high orientation temperatures (up to 210° F. in some cases). This is especially true when ethylene vinyl alcohol copolymer (EVOH), a useful oxygen barrier resin, is also incorporated in the structure. Thus, these factors are inconsistent with the potential option of lowering orientation temperature.

The inventors' solution has three features. First, the desired amount of nylon is introduced into the film formulation, not as a single layer, but as two or more layers. Second, the plural layers of nylon are separated by at least one intervening layer of a material having a modulus lower than the modulus of the crystalline nylon, and having a crystallinity of less than 60%. Third, the crystalline nylon is itself blended with a material which disrupts the crystallinity of the crystalline nylon.

SUMMARY OF THE INVENTION

The present invention pertains to a multilayer film comprising a first layer comprising a blend of a crystalline nylon and a material which disrupts the crystallinity of the crystalline nylon; a second layer comprising a blend of a crystalline nylon and a material which disrupts the crystallinity of the crystalline nylon; and a third layer, between the first and second layers, comprising a material having a modulus lower than the modulus of the crystalline nylon, and having a crystallinity of less than 60%. The multilayer film can further comprise an oxygen barrier layer adhered to the second layer, an abuse resistant layer adhered to the oxygen barrier layer, and/or a polymeric layer which is disposed between the abuse resistant layer and the oxygen barrier layer.

The present invention is also directed to a packaged product comprising a cooked meat product within a film, said film comprising a first layer comprising a blend of a crystalline nylon and a material which disrupts the crystallinity of the crystalline nylon; a second layer comprising a blend of a crystalline nylon and a material which disrupts the crystallinity of the crystalline nylon; and a third layer, between the first and second layers, comprising a material having a modulus lower than the modulus of the crystalline nylon, and having a crystallinity of less than 60%.

In another aspect, the invention is directed to a process for packaging a meat product in a package comprising encasing the meat product within a packaging film comprising a first layer comprising a blend of a crystalline nylon and a material which disrupts the crystallinity of the crystalline nylon, a second layer comprising a blend of a crystalline nylon and a material which disrupts the crystallinity of the crystalline nylon, and a third layer, between the first and second layers, comprising a material having a modulus lower than the modulus of the crystalline nylon, and having a crystallinity of less than 60%; and cooking the packaged meat product while it is encased in the packaging film.

The crystalline nylon is present in the blend in an amount of preferably 30 to 95%, based on the weight of the blend; more preferably, 40 to 90%; most preferably, 50 to 85%. A very useful blend comprises between 60 and 80% crystalline nylon. The choice of exact blend ratios depends at least in part on cost and performance considerations. Preferably, each blend layer has a thickness equal to or less than 25% of the total film thickness.

DETAILED DESCRIPTION OF THE INVENTION

As used herein, the term "film" refers to the product made by joining layers with adhesives, joining with heat and pressure, and even spread coating and extrusion coating. The term film is also inclusive of coextruded multilayer films optionally comprising one or more tie layers.

As used herein, the phrase "ethylene alpha-olefin copolymer" refer to such heterogeneous materials as linear low density polyethylene (LLDPE), and very low and ultra low density polyethylene (VLDPE and ULDPE); and homogeneous polymers such as metallocene catalyzed polymers such as EXACT (TM) materials supplied by Exxon, and TAFMER (TM) materials supplied by Mitsui Petrochemical Corporation. Other ethylene alpha-olefin copolymers, such as the long chain branched homogeneous ethylene alpha-olefin copolymers available from the Dow Chemical Company, known as AFFINITY (TM) resins, are also included as another type of ethylene alpha-olefin copolymer useful in the present invention.

In general, the multilayer film used in the present invention can have any total thickness desired, so long as the film provides the desired properties for the particular packaging operation in which the film is used. Preferably, the film used in the present invention has a total thickness (i.e., a combined thickness of all layers), of from about 0.5 to 10 mils (1 mil equals 0.001 inch); more preferably, from about 1 to 6 mils; and still more preferably, from 1.5 to 3.5 mils.

Figure 1:
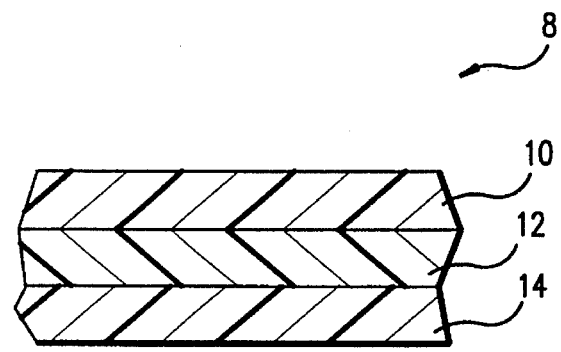
FIG. 1 illustrates an enlarged cross-sectional view of a three-layer multilayer film in accord with the present invention.

In FIG. 1, the multilayer film 8 comprises first layer 10, second layer 14, and a third intervening layer 12. The first and third layers 10 and 14 are preferably similar, and each comprise a blend of a crystalline nylon and a material which disrupts the crystallinity of the crystalline nylon.

Preferred crystalline nylons are nylon 6 and nylon 66, or copolyamides or terpolyamides which include these materials.

The material which disrupts crystallinity can itself be of high or low crystallinity, but when blended with the crystalline nylon acts to disrupt the crystallinity of the nylon when processed in an orientation process. By this is meant that the crystallinity of the nylon blend layers in the film, at the end of the orientation step, is less than it would be if only a single crystalline nylon were used in each layer. Preferred materials are polymeric, more preferably amidic, such as polyamide 11, polyamide 12, polyamide 610, polyamide 612, polyamide 6/12 copolymer, polyamide 6/66 copolymer, polyamide 66/610 copolymer.

Olefinic materials such as ethylene/unsaturated acid copolymer (e.g. ethylene acrylic acid copolymer), ethylene/unsaturated ester copolymer (e.g. ethylene vinyl acetate copolymer or ethylene alkyl acrylate copolymer), modified polyolefin including polymers modified by copolymerizing an olefin homopolymer or copolymer with unsaturated carboxylic acid, e.g., maleic acid, fumaric acid or the like, or a derivative thereof such as anhydride, ester or metal salt and ionomer can also be used as the crystallinity disrupting material.

Inorganic materials can also be used.

Also, recycled versions of, and blends of, any of these materials can be used as the blending (crystal disrupting) material.

The third layer 12 can comprise any suitable material, preferably polymeric, which has a modulus lower than the modulus of the crystalline nylon, and a crystallinity of less than 60%.

The modulus of the material of layer 12 can be less than 100,000 psi, such as less than 90,000 psi, less than 80,000 psi, less than 70,000 psi, and less than 60,000 psi. Preferably, the modulus is less than 50,000 psi, such as less than 40,000 psi, and less than 30,000 psi. Most preferably, the modulus is less than 20,000 psi, such as less than 10,000 psi. Lower modulus materials are useful because the lower the modulus, the more flexible the material. This in turn is important when orienting film material, especially in a blown bubble process. These low modulus materials offset the high modulus (high stiffness) of the nylon blend layers.

The crystallinity (in weight percent of raw material as supplied) of the material of the third layer is preferably less than 60%, such as less than 50%. More preferably, the crystallinity is less than 40%, such as less than 30%. Most preferably, the crystallinity is less than 20%, more preferably less than 10%. Examples include some materials from the following classes of materials: polyolefin polyamide, polymerized ethylene vinyl alcohol, polyvinylidene chloride, polyurethane, starch-containing polymer, and modified polyolefin; preferably, ethylene alpha olefin copolymer, propylene alpha olefin copolymer, butene alpha olefin copolymer, ethylene vinyl acetate copolymer, ethylene acrylate copolymer, and ethylene acrylic acid copolymer. Also, recycled versions of, and blends of, any of these materials can be used.

Figure 2:
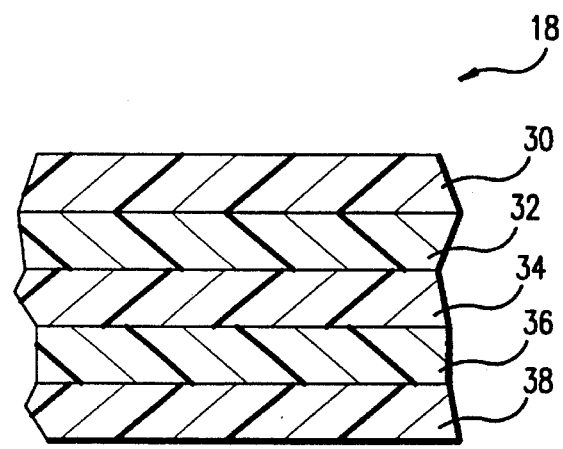
FIG. 2 illustrates an enlarged cross-sectional view of a five-layer multilayer film in accord with the present invention.
Figure 3:
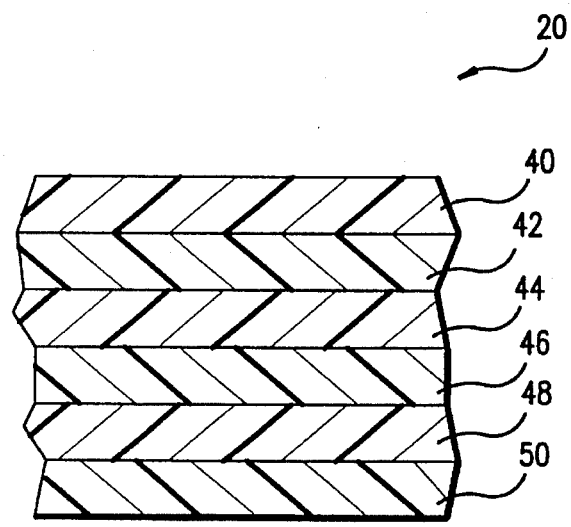
FIG. 3 illustrates an enlarged cross-sectional view of a six-layer multilayer film in accord with the present invention.
Figure 4:
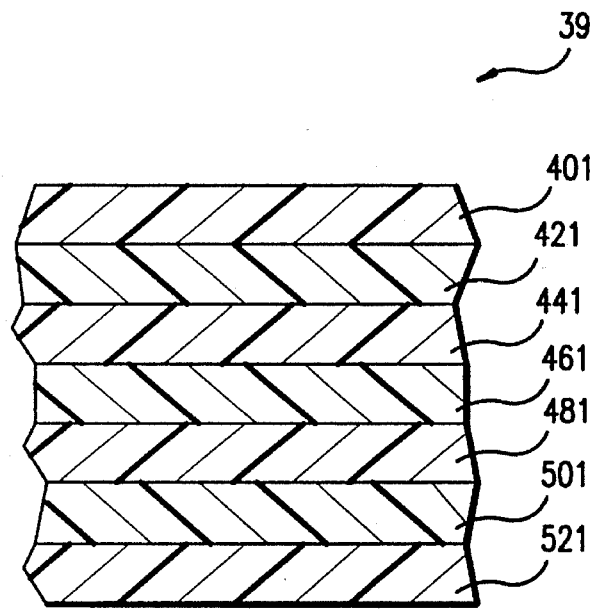
FIG. 4 illustrates an enlarged cross-sectional view of a seven-layer multilayer film in accord with the present invention.

FIGS. 2, 3, and 4 illustrate three alternative preferred embodiments of oriented, heat-shrinkable multilayer films to be used in accordance with the present invention. FIG. 2 illustrates a five-layer film 18; FIG. 3 illustrates a six-layer film 20; FIG. 4, a seven-layer film 39. These films are especially suited for conversion to heat-shrinkable bags, pouches, or casings for the packaging of meat products, in accordance with the present invention.

FIG. 2 illustrates an embodiment of a heat-shrinkable multilayer film 18 to be used in packaging meat in bags, casings, and films, in accordance with the present invention. Layers 30, 34, and 38 comprise the nylon blend described above for layers 10 and 14 of film 8. Layers 32 and 36 comprise any of the materials described for layer 12 of film 8.

FIG. 3 illustrates a preferred embodiment of a heat-shrinkable multilayer film 20 to be used in packaging meat in bags, casings, and films, in accordance with the present invention. Multilayer film 20 comprises first layer 40, second layer 42, third layer 44, fourth layer 46, fifth layer 48, and sixth layer 50.

First layer 40 and third layer 44 have a chemical composition like that of first and third layers 10 and 14 of film 8; the remaining layers comprise any of the materials described for layer 12 of film 8.

In FIG. 4, a multilayer film 39 comprises first layer 401, second layer 421, third layer 441, fourth layer 461, fifth layer 481, sixth layer 501, and seventh layer 521.

First layer 401, third layer 441, and fifth layer 481 are analogous to and have a chemical composition like that of first and third layers 10 and 14 of film 8 of FIG. 1.

Second layer 421, fourth layer 461, sixth layer 501, and seventh layer 521 are analogous to and have a chemical composition like that of layer 12 of film 8.

The films according to the present invention are suited to many different forms of packaging applications, such as shirred casings, heat shrinkable bags, films (both heat-shrinkable as well as non-heat-shrinkable), and web and lid stock suitable for thermoforming. However, the films illustrated in FIGS. 2 through 4 are especially suited for use in heat-shrinkable seamless casings. Thus, multilayer film 13 and multilayer film 21 preferably have a machine direction free shrink of at least 10 percent at a temperature of 185° F. for 8 seconds, and a transverse direction free shrink of at least about 10 percent at a temperature of 185□F. for 8 seconds. These values are at standard ASTM conditions.

The films of FIGS. 1 through 4 are preferably prepared by tubular coextrusion and blown bubble orientation processes well known in the art.

Although the nylon blend layers of films made in accordance with this invention can be separated by a single intervening layer, two or more intervening layers can be used to separate the nylon blend layers. In some cases, the latter approach can be beneficial for cost and/or performance considerations.

The resulting multilayer film can be used to form bags, casings, etc., which, in turn, can be used for the packaging of meat products.

The polymer components used to fabricate multilayer films according to the present invention may also contain appropriate amounts of other additives normally included in such compositions. These include slip agents, antioxidants, fillers, dyes, pigments, radiation stabilizers, antistatic agents, elastomers, and other additives known to those of skill in the art of packaging films.

The multilayer film of the present invention is preferably irradiated. In the irradiation process, the film is subjected to an energetic radiation treatment, such as X-ray, gamma ray, beta ray, and high energy electron treatment, which induce cross-linking between molecules of the irradiated material. A preferred radiation dosage of high energy electrons is between 20 and 200 kGy (kilograys), more preferably between 50 and 150 kGy, most preferably about 100 kGy (for clipped seamless casings). Preferably, irradiation is carded out by an electron accelerator and the dosage level is determined by standard dosimetry methods.

Although in general the product in the package can be any cooked meat product, preferably the cooked meat product is poultry, pork, beef, lamb, or fish.

Figure 5:
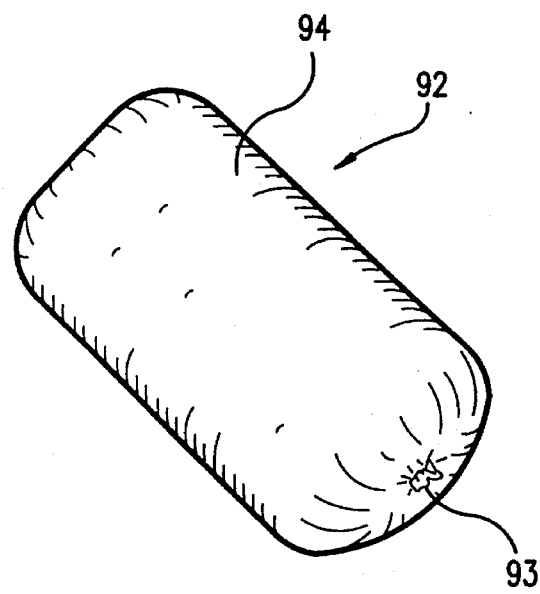
FIG. 5 illustrates a perspective view of a packaged product according to the present invention.

FIG. 5 illustrates one embodiment of a packaged product 92 of the present invention, the product being packaged in a casing closed by a pair of clips 93 at each end thereof, with only one being illustrated in FIG. 5. Film 94, used to package the meat product, can be for example, multilayer film 20 illustrated in FIG. 3, which is discussed in detail above. In FIG. 5, the cooked meat product preferably comprises mortadella or other food products.

The invention is illustrated by the following examples, which are provided for the purpose of representation, and are not to be construed as limiting the scope of the invention. Unless stated otherwise, all percentages, parts, etc. are by weight.

EXAMPLES

Table 1 discloses the commercial resins of the following examples and identifies their source.

Table 2 discloses the chemical composition of the commercial resins of Table 1.

Table 3 discloses the films made from those resins.

Tables 4 and 5 disclose additional films which can be made in accordance with the invention.

Table 6 discloses the results of processing of some these films, and final properties.

In the tables, "Comp." refers to a comparative example. The numeric values under each layer of the comparative examples and example 1 of Table 3 are layer gauge thicknesses. "Gauge" refers to thickness; 100 gauge=1 mil, and 1 mil=0.001 inches or about 25.4 microns.

TABLE 1

| RESIN | TRADENAME | SOURCE |
| --- | --- | --- |
| $EAO_1$ | TAFMER A 1085 | MITSUI |
| $EAO_2$ | DOWLEX 2045.03 | DOW |
| $NYLON_1$ | ULTRAMID B4 | BASF |
| $NYLON_2$ | GRILON CF6S | EMSER |
| $EVA_1$ | PE 5269 T | CHEVRON |
| $EMAA_1$ | NUCREL 1202 HC | DUPONT |
| $ADH_1$ | TYMOR 1203 | MORTON INTERNATIONAL |
| $ADH_2$ | PLEXAR 360 | QUANTUM |
| $EVOH_1$ | EVAL LC-E105A | EVALCA |
| $LDPE_1$ | EPE 10214-C | TEKNOR COLOR |

TABLE 2

| RESIN | DESCRIPTION |
| --- | --- |
| $EAO_1$ | single site catalyzed linear polyethylene = ethylene/butene copolymer |
| $EAO_2$ | linear low density polyethylene = ethylene octene copolymer |
| $NYLON_1$ | nylon 6 = polycaprolactam |
| $NYLON_2$ | nylon 6/12 = caprolactam/laurolactam copolyamide |
| $EVA_1$ | ethylene vinyl acetate copolymer (6.5% vinyl acetate) |
| $EMAA_1$ | ethylene methacrylic acid copolymer |
| $ADH_1$ | anhydride-grafted linear low density polyethylene |
| $ADH_2$ | anhydride-grafted linear low density polyethylene |
| $EVOH_1$ | ethylene vinyl alcohol copolymer (44 mole % ethylene) |
| $LDPE_1$ | 50% low density polyethylene + 50% $TiO_2$ |

TABLE 3

COMP. 1
80% $N_1$ + /80% $ADH_1$ + /$ADH_1$/$EVOH_1$/$ADH_1$/65% $EVA_1$ +
20% $N_2$    20% $EAO_1$                              20% $EAO_2$ +
                                                      15% $LDPE_1$
2.0          4.5           1.5    1.2    1.5         7.0

COMP. 2
80% $N_1$ + /80% $ADH_1$ + /$ADH_1$/$EVOH_1$/$ADH_1$/65% $EVA_1$ +
20% $N_2$    20% $EAO_1$                              20% $EAO_2$ +
                                                      15% $LDPE_1$
3.0          4.5           1.5    1.2    1.5         6.2

COMP. 3
80% $N_1$ + /80% $ADH_1$ + /$ADH_1$/$EVOH_1$/$ADH_1$/65% $EVA_1$ +
20% $N_2$    20% $EAO_1$                              20% $EAO_2$ +
                                                      15% $LDPE_1$
1.3          3.5           1.5    1.2    1.5         8.0

TABLE 3-continued

EXAMPLE 1
80% $N_1$ + /80% $ADH_1$ + /80% $N_1$ + /$EVOH_1$/$ADH_1$/65% $EVA_1$ +
20% $N_2$    20% $EAO_1$    20% $N_2$            20% $EAO_2$ +
                                                 15% $LDPE_1$
1.6          3.5            1.6         1.2  1.5  8.3

Other examples of films that can be made in accordance with the invention appear in Table 4 below. In these examples:

$blend_1$=80% $N_1$+20% $N_2$
$blend_2$=50% $N_1$+50% $N_2$
$blend_3$=80% $N_1$+20% $EMAA_1$
$blend_4$=50% $N_1$+50% $EMAA_1$

TABLE 4

EXAMPLE 2
$blend_1$/80% $ADH_1$ + /$blend_1$/$EVOH_1$/$blend_1$/$ADH_1$/80% $EVA_1$ +
    20% $EAO_1$                                  20% $EAO_2$ EXAMPLE 3
$blend_2$/80% $ADH_1$ + /$blend_2$/$EVOH_1$/$blend_2$/$ADH_1$/80% $EVA_1$ +
    20% $EAO_1$                                  20% $EAO_2$ EXAMPLE 4
$blend_3$/80% $ADH_1$ + /$blend_3$/$EVOH_1$/$blend_3$/$ADH_1$/80% $EVA_1$ +
    20% $EAO_1$                                  20% $EAO_2$ EXAMPLE 5
$blend_4$/80% $ADH_1$ + /$blend_4$/$EVOH_1$/$blend_4$/$ADH_1$/80% $EVA_1$ +
    20% $EAO_1$                                  20% $EAO_2$ EXAMPLE 6
$ADH_2$/$blend_1$/80% $ADH_1$ + /$EVOH_1$/$blend_1$/$ADH_1$/80% $EVA_1$ +
        20% $EAO_1$                              20% $EAO_2$ EXAMPLE 7
$ADH_2$/$blend_2$/80% $ADH_1$ + /$EVOH_1$/$blend_2$/$ADH_1$/80% $EVA_1$ +
        20% $EAO_1$                              20% $EAO_2$ EXAMPLE 8
$ADH_2$/$blend_3$/80% $ADH_1$ + /$EVOH_1$/$blend_3$/$ADH_1$/80% $EVA_1$ +
        20% $EAO_1$                              20% $EAO_2$ EXAMPLE 9
$ADH_2$/$blend_4$/80% $ADH_1$ + /$EVOH_1$/$blend_4$/$ADH_1$/80% $EVA_1$ +
        20% $EAO_1$                              20% $EAO_2$ EXAMPLE 10
$blend_1$/80% $ADH_1$ + 20% $EAO_1$/$blend_1$/$ADH_1$/80% $EVA_1$ + 20% $EAO_2$ EXAMPLE 11
$blend_2$/80% $ADH_1$ + 20% $EAO_1$/$blend_2$/$ADH_1$/80% $EVA_1$ + 20% $EAO_2$ EXAMPLE 12
$blend_3$/80% $ADH_1$ + 20% $EAO_1$/$blend_3$/$ADH_1$/80% $EVA_1$ + 20% $EAO_2$ EXAMPLE 13
$blend_4$/80% $ADH_1$ + 20% $EAO_1$/$blend_4$/$ADH_1$/80% $EVA_1$ + 20% $EAO_2$ EXAMPLE 14
$EAO_2$/80% $ADH_1$ + /$blend_1$/80% $ADH_1$ + /$blend_1$/$ADH_1$/80% $EVA_1$ +
    20% $EAO_1$        20% $EAO_1$              20% $EAO_2$ EXAMPLE 15
$EAO_2$/80% $ADH_1$ + /$blend_2$/80% $ADH_1$ + /$blend_2$/$ADH_1$/80% $EVA_1$ +
    20% $EAO_1$        20% $EAO_1$              20% $EAO_2$ EXAMPLE 16
$EAO_2$/80% $ADH_1$ + /$blend_3$/80% $ADH_1$ + /$blend_3$/$ADH_1$/80% $EVA_1$ +
    20% $EAO_1$        20% $EAO_1$              20% $EAO_2$ EXAMPLE 17
$EAO_2$/80% $ADH_1$ + /$blend_4$/80% $ADH_1$ + /$blend_4$/$ADH_1$/80% $EVA_1$ +
    20% $EAO_1$        20% $EAO_1$              20% $EAO_2$ The nylon blends can differ from each other, even within a single film, as shown in the examples of Table 5.

TABLE 5

EXAMPLE 18
$blend_1$/80% $ADH_1$ + /$blend_2$/$EVOH_1$/$blend_3$/$ADH_1$/80% $EVA_1$ +
    20% $EAO_1$                                  20% $EAO_2$ EXAMPLE 19
$blend_1$/80% $ADH_1$ + /$blend_2$/$EVOH_1$/$blend_4$/$ADH_1$/80% $EVA_1$ +
    20% $EAO_1$                                  20% $EAO_2$ EXAMPLE 20
$blend_1$/80% $ADH_1$ + /$blend_3$/$EVOH_1$/$blend_4$/$ADH_1$/80% $EVA_1$ +
    20% $EAO_1$                                  20% $EAO_2$ EXAMPLE 21
$blend_2$/80% $ADH_1$ + /$blend_3$/$EVOH_1$/$blend_4$/$ADH_1$/80% $EVA_1$ +
    20% $EAO_1$                                  20% $EAO_2$ EXAMPLE 22
$ADH_2$/$blend_1$/80% $ADH_1$ + /$EVOH_1$/$blend_2$/$ADH_1$/80% $EVA_1$ +
        20% $EAO_1$                              20% $EAO_2$ EXAMPLE 23
$ADH_2$/$blend_1$/80% $ADH_1$ + /$EVOH_1$/$blend_3$/$ADH_1$/80% $EVA_1$ +
        20% $EAO_1$                              20% $EAO_2$ EXAMPLE 24
$ADH_2$/$blend_1$/80% $ADH_1$ + /$EVOH_1$/$blend_4$/$ADH_1$/80% $EVA_1$ +
        20% $EAO_1$                              20% $EAO_2$ EXAMPLE 25
$ADH_2$/$blend_2$/80% $ADH_1$ + /$EVOH_1$/$blend_4$/$ADH_1$/80% $EVA_1$ +
        20% $EAO_1$                              20% $EAO_2$ EXAMPLE 26
$blend_1$/80% $ADH_1$ + 20% $EAO_1$/$blend_2$/$ADH_1$/80% $EVA_1$ + 20% $EAO_2$ EXAMPLE 27
$blend_1$/80% $ADH_1$ + 20% $EAO_1$/$blend_3$/$ADH_1$/80% $EVA_1$ + 20% $EAO_2$ EXAMPLE 28
$blend_1$/80% $ADH_1$ + 20% $EAO_1$/$blend_4$/$ADH_1$/80% $EVA_1$ + 20% $EAO_2$ EXAMPLE 29
$blend_2$/80% $ADH_1$ + 20% $EAO_1$/$blend_4$/$ADH_1$/80% $EVA_1$ + 20% $EAO_2$ EXAMPLE 30
$EAO_2$/80% $ADH_1$ + /$blend_1$/80% $ADH_1$ + /$blend_2$/$ADH_1$/80% $EVA_1$ +
    20% $EAO_1$        20% $EAO_1$              20% $EAO_2$ EXAMPLE 31
$EAO_2$/80% $ADH_1$ + /$blend_1$/80% $ADH_1$ + /$blend_3$/$ADH_1$/80% $EVA_1$ +
    20% $EAO_1$        20% $EAO_1$              20% $EAO_2$ EXAMPLE 32
$EAO_2$/80% $ADH_1$ + /$blend_1$/80% $ADH_1$ + /$blend_4$/$ADH_1$/80% $EVA_1$ +
    20% $EAO_1$        20% $EAO_1$              20% $EAO_2$ EXAMPLE 33
$EAO_2$/80% $ADH_1$ + /$blend_2$/80% $ADH_1$ + /$blend_3$/$ADH_1$/80% $EVA_1$ +
    20% $EAO_1$        20% $EAO_1$              20% $EAO_2$

TABLE 6

| EXAMPLE | RRESULTS |
| --- | --- |
| COMP. 1 | had a lower orientation speed, and a narrower processing window than COMP. 3 and Example 1; bubble breaks occurred every 10–15 minutes |
| COMP. 2 | the presence of a large number of gels in the coextruded tape prevented proper evaluation |
| COMP. 3 | oriented best; stable orienting bubble and high racking speed, but lower (1.6 mils) amount of nylon with limited toughness |
| EXAMPLE 1 | oriented best; stable orienting bubble and high racking speed, but higher (3.2 mils) amount of nylon with better toughness |

It is believed that in the particular structures evaluated in Table 5, racking (orientation) problems would be encountered in Comp. 3 if the thickness of the nylon layer went beyond about 2.0 mils. The actual critical nylon thickness, i.e. the thickness at and beyond which serious orientation problems occur, will vary from structure to structure.

In Example 1, the nylon blend layer was in effect "split", i.e. incorporated as plural layers in the film, separated by a much softer polyolefinic layer which was very orientable. In this way, the overall nylon content of the film can be increased without encountering substantial difficulties in orientation. No bubble breaks were encountered in making the film of Example 1.

It is believed that up to 40%, 50%, or even 60% nylon can be incorporated into the film structure of the present invention while providing an oriented, heat shrinkable film. The exact amount that can be used will depend on a variety of factors, such as relative film thicknesses, composition of each layer, desired speed of orientation, etc.

Those skilled in the art will recognize modifications that can be made to the present invention.

What is claimed is:

1. A multilayer film comprising:
   a) a first layer consisting essentially of a blend of a first crystalline nylon and a material which disrupts the crystallinity of the crystalline nylon, said material selected from the group consisting of
      i) a second crystalline nylon different from the first crystalline nylon, and
      ii) olefinic material;
   b) a second layer consisting essentially of a blend of a first crystalline nylon and a material which disrupts the crystallinity of the crystalline nylon, said material selected from the group consisting of
      i) a second crystalline nylon different from the first crystalline nylon, and
      ii) olefinic material; and
   c) a third layer, between the first and second layers, comprising a material having a modulus lower than the modulus of the crystalline nylon, and having a crystallinity of less than 60%.

2. The film of claim 1 wherein the film is oriented and heat shrinkable.

3. The film of claim 1 wherein the film is at least partially cross-linked.

4. The film of claim 1 wherein the first crystalline nylon is selected from the group consisting of nylon 6, nylon 66, copolyamides and terpolyamides.

5. The film of claim 1 wherein the olefinic material is selected from the group consisting of ethylene/unsaturated acid copolymer, ethylene/unsaturated ester copolymer, modified polymer, and ionomer.

6. The film of claim 1 wherein the material having a modulus lower than the modulus of the crystalline nylon, and having a crystallinity of less than 60% comprises a material with a modulus less than 50,000 psi.

7. The film of claim 6 wherein the material having a modulus lower than the modulus of the crystalline nylon, and having a crystallinity of less than 60% comprises a material with a modulus less than 40,000 psi.

8. The film of claim 6 wherein the material having a modulus lower than the modulus of the crystalline nylon, and having a crystallinity of less than 60% comprises a material with a crystallinity less than 50%.

9. The film of claim 1 wherein the material having a modulus lower than the modulus of the crystalline nylon, and having a crystallinity of less than 60%, is selected from the group consisting of polyolefin, polyamide, polymerized ethylene vinyl alcohol, polyvinylidene chloride, polyurethane, and starch-containing polymer.

10. The film of claim 1 wherein the first layer comprises a blend having at least 50% of the crystalline nylon.

11. The film of claim 10 wherein the first layer comprises a blend having at least 60% of the crystalline nylon.

12. The film of claim 1 further comprising an oxygen barrier layer adhered to the second layer.

13. The film of claim 12 further comprising an abuse resistant layer adhered to the oxygen barrier layer.

14. The film of claim 13 further comprising a polymeric layer which is disposed between the abuse resistant layer and the oxygen barrier layer.

15. The film of claim 14 wherein the polymeric layer comprises a polymeric adhesive.

16. The film of claim 14 wherein the polymeric layer comprises a material having a modulus lower than the modulus of the crystalline nylon, and having a crystallinity of less than 60%.

17. The film of claim 14 further comprising an additional blend layer disposed between the polymeric layer and the oxygen barrier layer, the additional blend layer comprising a blend of a crystalline nylon and a material which disrupts the crystallinity of the crystalline nylon.

18. The film of claim 1 further comprising a sealant layer adhered to the first layer.

19. The film of claim 18 further comprising a polymeric layer which is disposed between the sealant layer and the first layer.

20. The film of claim 19 wherein the polymeric layer comprises a polymeric adhesive.

21. The film of claim 19 wherein the polymeric layer comprises a material having a modulus lower than the modulus of the crystalline nylon, and having a crystallinity of less than 60%.

22. A packaged product comprising a cooked meat product within a film, said film comprising a first layer consisting essentially of a blend of a first crystalline nylon and a material which disrupts the crystallinity of the crystalline nylon; a second layer consisting essentially of a blend of a first crystalline nylon and a material which disrupts the crystallinity of the crystalline nylon; and a third layer, between the first and second layers, comprising a material with a modulus lower than the modulus of the crystalline nylon, and a crystallinity of less than 60%; said material which disrupts the crystallinity of the crystalline nylon is selected from the group consisting of a second crystalline nylon different from the first crystalline nylon and olefinic material.

23. A process for packaging a meat product in a package comprising:
   a) encasing the meat product within a packaging film comprising a first layer consisting essentially of a blend of a first crystalline nylon and a material which disrupts the crystallinity of the crystalline nylon, a second layer consisting essentially of a blend of a first crystalline nylon and a material which disrupts the crystallinity of the crystalline nylon, and a third layer, between the first and second layers, comprising a material having a modulus lower than the modulus of the crystalline nylon, and having a crystallinity of less than 60%; said material which disrupts the crystallinity of the crystalline nylon is selected from the group consisting of a second crystalline nylon different from the first crystalline nylon and olefinic material and
   b) cooking the packaged meat product while it is encased in the packaging film.

24. The process of claim 23 comprising the further step of heat shrinking the film around the meat product during the cooking step.

25. A multilayer film comprising:

a) a first layer consisting essentially of a blend of a first crystalline nylon and a material selected from the group consisting of a second crystalline nylon different from the first crystalline nylon, ethylene/unsaturated acid copolymer, ethylene/unsaturated ester copolymer, modified polymer, and ionomer;

b) a second layer consisting essentially of a blend of a first crystalline nylon and a material selected from the group consisting of a second crystalline nylon different from the first crystalline nylon, ethylene/unsaturated acid copolymer, ethylene/unsaturated ester copolymer, modified polymer, and ionomer; and c) a third layer, between the first and second layers, comprising a material having a modulus lower than the modulus of the crystalline nylon, and having a crystallinity of less than 60%.

* * * * *